March 17, 1953  W. H. J. BROCK  2,631,906

SEALING DEVICE FOR FLUID PRESSURE APPARATUS

Filed Jan. 14, 1946

INVENTOR.
WILLIAM HUDSON JAMES BROCK
BY
T. J. Plante
ATTORNEY

Patented Mar. 17, 1953

2,631,906

UNITED STATES PATENT OFFICE 2,631,906

SEALING DEVICE FOR FLUID PRESSURE APPARATUS

William Hudson James Brock, Leamington Spa, England, assignor of one-half to Automotive Products Company Limited, Leamington Spa, England Application January 14, 1946, Serial No. 641,077
In Great Britain January 12, 1945

7 Claims. (Cl. 309—23)

This invention relates to sealing devices for fluid pressure apparatus, such as are used for preventing leakage of fluid between shafts, plungers or the like and the cylinders or other housings in which they are located. The sealing device according to the invention is of the kind comprising an annular sealing member of india rubber, synthetic rubber-like material, rubber impregnated fabric or other suitable material, of U-shaped cross section, supported on a shoulder on the shaft, plunger or equivalent (or in the housing) and having one wall of the U-section constituting a lip which engages with the wall of the housing (or of the shaft, plunger or equivalent).

The object of the invention is to provide, combined in a single unit, positioning means for the sealing member and means for holding the lip against the surface with which it engages.

According to the invention, the U-section sealing member is held against the shoulder by a retaining disc comprising a circumferentially continuous portion of substantially L-section enclosing the second wall of the sealing member and having interlocking engagement with the part by which the sealing device is carried, and inclined radial fingers projecting from the edge of the said continuous portion which lies within the groove of the U-shaped member, to engage and support the lip of said member.

In one form of the invention the retaining disc comprises an annular portion which is initially coned or dished and has a locking edge deformed radially by flattening of the disc to cause it to engage the shouldered element, a substantially cylindrical flange at the non-locking edge of the annular portion being adapted to extend into the groove of the U-section sealing member and carrying inclined fingers to engage the lip of the sealing member.

The lip may be formed by the outer wall of the sealing member, the said member being mounted on a piston, plunger or like element having a central spigot surrounded by the shoulder on which the sealing member rests, and the locking edge of the annular portion of the retaining disc engaging with the said spigot.

Alternatively, the lip may be formed by the inner wall of the sealing member, the said member being mounted against a shoulder in a cylinder or like housing, and the locking edge of the annular portion of the retaining disc engaging with the wall of said housing.

A secondary shoulder may be provided on the spigot or housing wall, the retaining disc resting on the said secondary shoulder to provide positive axial location thereof, and the spigot or housing wall may be grooved circumferentially at the secondary shoulder, the locking edge of the retaining disc entering the groove when the annular portion of the said disc is flattened.

The retaining disc may be formed from sheet metal by pressing or stamping.

The invention is hereinafter described with reference to the accompanying drawings, in which—

Figure 2:
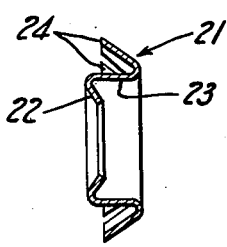
Figure 2 is a section through the retaining disc of the sealing device shown in Figure 1, the said retaining disc being shown as it appears prior to assembly on the piston.
Figure 3:
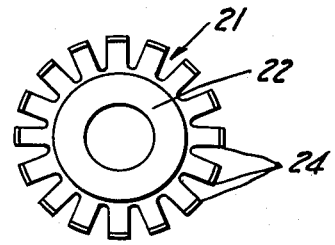
Figure 4:
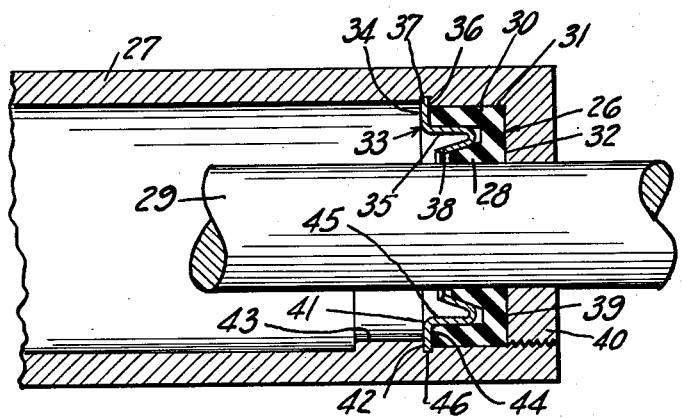

Figure 3 is an elevation of the retaining disc in a plane at right angles to that of Figure 2; and Figure 4 is a sectional elevation of part of a liquid pressure ram-and-cylinder device having a sealing device according to the invention mounted in the cylinder to prevent leakage of liquid along the ram, slightly different arrangements of the sealing device being shown in the upper and lower halves of the figure.

Figure 1:
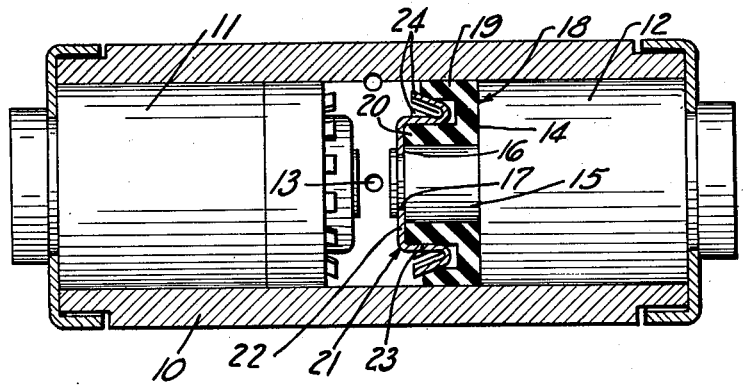
Figure 1 is a sectional view of a wheel cylinder for a liquid pressure braking system, having a sealing device according to the invention mounted on each of the pistons.

Referring to Figure 1, the wheel cylinder 10 has slidable therein two pistons 11 and 12 which are urged apart by liquid pressure admitted through an inlet 13, to spread a pair of brake shoes (not shown) and cause them to engage with a surrounding drum. The two pistons are identical, so the following description will refer to only one of them. The piston 12 is reduced in diameter at its inner end to form a shoulder 14 surrounding a spigot 15, which is itself reduced in diameter to form a second shoulder 16 near its free end, a circumferential groove 17 being formed in the reduced portion of the spigot where it joint the larger-diameter portion. A U-section rubber ring 18 having a flat base, a tapered outer wall 19 forming a lip, and an inner wall 20 of substantially uniform thickness, fits over the spigot 15 and seats on the shoulder 14, the wall 20 fitting closely about the spigot 15, and being of an axial length slightly greater than the distance between the shoulders 14 and 16. The lip 19 of the ring 18 engages with the cylinder wall.

The ring 18 is held on the piston by a retaining ring, shown separately in Figures 2 and 3, and indicated generally by the reference 21. The retaining ring comprises an annular portion 22, initially coned as in Figure 2, and having a central aperture large enough to pass over the reduced portion of the spigot, a cylindrical flange 23 forming, with the annular portion 22, a circumferentially continuous ring of substantially L-section, and a plurality of divergent radial fingers 24 projecting from the edge of the flange 23 and bent outwardly and backwardly towards the plane of the annular portion.

To secure the retaining disc in position on the piston, it is passed over the reduced portion of the spigot, the flange 23 and fingers 24 entering the groove of the ring 18, until the inner or locking edge of the annular portion 22 rests on the shoulder 16. The annular portion is then flattened, causing the locking edge to be deformed inwardly and to enter the circumferential groove 17, so that the retaining disc and piston are interlocked, and the ring 18 is held between them. As the wall 20 of the ring 18 is slightly longer than the distance between the shoulders 14 and 16, this wall of the ring is compressed axially when the retaining disc is placed in position, thus causing the base of the ring to seat firmly on the shoulder 14 and preventing leakage of fluid around the back of the ring.

The sealing device shown in Figure 4 is similar to that shown in Figure 1, but in this case the U-shaped ring 26 is mounted in the cylinder 27 of the ram-and-cylinder unit, and its inner wall 28 forms the lip which engages with the surface of the ram 29.

Two alternative arrangements are shown, the U-shaped ring in the upper half of the figure being fitted from the remote end of the cylinder, and the U-shaped ring in the lower half being fitted from the adjacent end of the cylinder. In the first arrangement, the outer wall 30 of the ring fits in a slightly reduced portion 31 of the cylinder 27, against an internal shoulder 32, and the retaining disc, generally indicated by the reference 33, has its annular portion 34 projecting outwardly from the cylindrical flange 35, the portion 34 resting on a secondary shoulder 36 in the cylinder. The locking edge of the portion 34 enters, when the said portion is flattened, a circumferential groove 37 in the cylinder wall. The fingers 38 of the retaining disc project inwardly to engage the lip 28 of the U-section ring. In the second arrangement, the shoulder against which the U-section ring rests is formed by the inner face 39 of a collar 40 screwed into the open end of the cylinder, and the retaining disc 41 is located by a shoulder 42 formed by an internal rib 43 in the cylinder. The annular portion 44 of the retaining disc is initially coned to an obtuse angle with the cylindrical flange 45, instead of to an acute angle as in the previous examples, and the retaining disc is inserted from the adjacent end of the cylinder, and its locking edge expanded into a circumferential groove 46 by flattening the annular portion. The U-section ring 26 is fitted in place after the retaining disc, and is pushed up against the retaining disc by screwing in the collar 40, to compress the wall 30 in the axial direction.

What I claim is:

1. A sealing device of the kind referred to, wherein the inner wall of a U-section sealing member engages a surface on a shouldered element and is located axially between the shoulder and a retaining disc, said disc comprising an an annular portion which is initially coned or dished and has a locking edge deformed radially by flattening of the disc to cause it to engage said element, a substantially cylindrical flange at the non-locking edge of the annular portion adapted to extend into the groove of the U-section sealing member, and inclined fingers carried by the flange to engage the lip of the sealing member.

2. A sealing device according to claim 1, wherein the lip is formed by the outer wall of the sealing member, the said member being mounted on a piston, plunger or like element having a central spigot surrounded by the shoulder on which the sealing member rests, and the locking edge of the annular portion of the retaining disc engaging with the said spigot.

3. A sealing device according to claim 1, wherein the lip is formed by the inner wall of the sealing member, the said member being mounted against a shoulder in a cylinder or like housing, and the locking edge of the annular portion of the retaining disc engaging with the wall of said housing.

4. A sealing device according to claim 1, wherein the lip is formed by the inner wall of the sealing member, the said member being mounted against a shoulder in a cylinder or like housing, and the locking edge of the annular portion of the retaining disc engaging with the wall of said housing, and wherein a secondary shoulder is provided on the spigot or housing wall, and the retaining disc rests on said secondary shoulder to provide positive axial location thereof.

5. A sealing device according to claim 1, wherein the lip is formed by the inner wall of the sealing member, the said member being mounted against a shoulder in a cylinder or like housing, and the locking edge of the annular portion of the retaining disc engaging with the wall of said housing, and wherein a secondary shoulder is provided on the spigot or housing wall, and the retaining disc rests on said secondary shoulder to provide positive axial location thereof, the spigot or wall being grooved circumferentially at the secondary shoulder, the locking edge of the retaining disc entering the groove when the annular portion of the said disc is flattened.

6. A sealing device according to claim 1, wherein the retaining disc is formed from sheet metal by pressing or stamping.

7. A sealing device according to claim 1, wherein the lip is formed by the inner wall of the sealing member, the said member being mounted against a shoulder in a cylinder or like housing, and the locking edge of the annular portion of the retaining disc engaging with the wall of said housing, and wherein a secondary shoulder is provided on the spigot or housing wall, and the retaining disc rests on said secondary shoulder to provide positive axial location thereof, the secondary shoulder being spaced from the main shoulder by a distance less than the axial depth of the second wall of the U-section sealing member, so that the said wall is compressed axially when the sealing device is assembled.

WILLIAM HUDSON JAMES BROCK.

REFERENCES CITED

The following references are of record in the file of this patent:

UNITED STATES PATENTS

| Number | Name | Date |
|---|---|---|
| 556,704 | Stevens | Mar. 17, 1896 |
| 1,958,907 | Brouwer | May 15, 1934 |
| 2,049,063 | Hubbard | July 28, 1936 |
| 2,076,747 | Salisbury | Apr. 13, 1937 |
| 2,313,271 | Schnell | Mar. 9, 1943 |